United States Patent [19]

Hughes

[11] 4,018,523
[45] Apr. 19, 1977

[54] REPRODUCING APPARATUS AND PROCESS FOR FORMING MULTIPLE COPIES OF A DOCUMENT

[75] Inventor: Edwin L. Hughes, Pittsford, N.Y.

[73] Assignee: Xerox Corporation, Stamford, Conn.

[22] Filed: July 24, 1975

[21] Appl. No.: 598,612

[52] U.S. Cl. .................................. 355/8; 355/14; 355/51
[51] Int. Cl.² ....................................... G03G 15/30
[58] Field of Search ............. 355/8, 14, 50, 51, 17

[56] References Cited
UNITED STATES PATENTS 3,900,258  8/1975  Hoppner et al. ................ 355/8 X
3,909,128  9/1975  Sohm .................................... 355/8

Primary Examiner—L. T. Hix
Assistant Examiner—Kenneth C. Hutchison
Attorney, Agent, or Firm—James J. Ralabate; Michael H. Shanahan; Paul Weinstein

[57] ABSTRACT

A reproducing apparatus and process for forming multiple copies of a document. The apparatus includes a moving photosensitive surface. The first copy of the document is formed while the document is moving in synchronism with the photosensitive surface and the second and further copies of the document are formed while the document is held stationary. The multiple copy mode of operation can be combined with other modes of operation such as reduction, a single copy mode and a large document copying mode, as desired, to provide an apparatus having substantial versatility.

22 Claims, 2 Drawing Figures

REPRODUCING APPARATUS AND PROCESS FOR FORMING MULTIPLE COPIES OF A DOCUMENT

BACKGROUND OF THE INVENTION

This invention relates to a reproducing apparatus and process for forming multiple copies of a document. Document damage is substantially reduced by forming the first copy while the document is moving and additional copies while the document is held stationary.

There are presently available commercial reproducing machines such as the Xerox 3100 LDC copier which include means for making multiple copies of a document and further which can be operated in different modes of operation. In one mode of operation the aforenoted copier can make copies from a moving document whereas in another mode of operation the copier can make copies of documents held stationary.

In U.S. Pat. No. 3,844,653 to Kelly, yet another reproducing apparatus is shown. This apparatus is adapted to form duplex copies or copies which include images on both sides of the sheet. The first side of the document is viewed using a belt-type feeder the document past a fixed slit exposure system. The document is then fed back to the document tray or on to a rotating drum where the second side of the document can be viewed by a second fixed slit exposure system. A mirror is provided which pivots between the respective slit exposure systems to automatically switch from one to the other depending on which side of the document is being copied. In this system a copy of the first side of the document is formed as it is fed to the second exposure device for copying its second side.

In U.S. application Ser. No. 549,684 to Ari Bar-on, there is disclosed a dual purpose document handling system. This apparatus is adapted for use with a machine adapted to operate in moving and stationary document exposure modes such as the aforenoted 3100 LDC copier. In accordance with the invention disclosed in this application, a belt-type document feeder is utilized as a document handling system for placing documents on a platen to provide a scanning optical exposure or for advancing the documents over the platen in synchronism with a photosensitive surface to provide a moving original exposure.

There are other document handling systems described in the prior art for use with either moving or stationary original exposure systems. The use of a document handling system with a stationary original exposure device has found commercial applicability. In the commercial systems a document is rapidly advanced on to a platen for viewing by the optics of the reproducing machine, and then rapidly advanced off the platen while a new document is advanced on. In order to provide sufficient throughput for the producing machine, it is necessary to advance the documents on and off the platen in less than about ½ second. This requires relatively high speeds as compared to the processing speed of the apparatus. For example, speeds of 30 to 40 inches per second are often used as compared to process speeds which may vary from 3 to 20 inches per second.

One of the difficulties encountered with document handling systems is their propensity to damage documents during operation. Since the documents may be quite valuable and sometimes irreplaceable, it is, of course, desired to minimize or eliminate this propensity for document damage. The present invention is directed toward a process and apparatus which should enable such a reduction in document damage by substantially reducing the speed of the document as it is advanced over the platen.

SUMMARY OF THE INVENTION

In accordance with the present invention, a reproducing apparatus and process are provided for forming multiple copies of a document. The apparatus includes a moving photosensitive surface. Means are provided for forming the first copy of the document while the document is moving in synchronism with the photosensitive surface. Means are provided responsive to the first means for forming the second and additional copies of the document while the document is held stationary. The apparatus and process are adapted to substantially continuously form multiple copies of the document in a single copying run even through the first copy is formed by a mode of exposure different from the second and additional copies.

The means for forming the first copy preferably includes optical means for viewing the moving document and projecting an image thereof on to the photosensitive surface. The means responsive to the first means for forming additional copies of the document preferably is automatically responsive thereto and includes optical means for viewing the stationary document and projecting an image thereof on to the photosensitive surface. Preferably, the first optical means and second optical means comprise a multi-mode optical exposure system including scanning optics for stationary original exposure which may be fixed at a given position for moving original exposure.

In accordance with yet other embodiments of the present invention, additional modes of operation may be included such as a large document copying mode and/or one or more differing magnification modes. If desired, in accordance with a preferred embodiment, means can be provided for rapidly advancing documents from their stationary position out of the view of the optics. Other modes of operation are also disclosed hereafter.

Accordingly, it is an object of the present invention to provide an improved reproducing apparatus and process for forming multiple copies of a document.

It is a further object of this invention to provide an apparatus and process as above having a reduced propensity to damage documents.

These and other objects of the present invention will become more apparent from the following drawings and description:

DETAILED DESCRIPTION OF THE PREFERRED EMBODIMENTS

In accordance with the present invention, a reproducing apparatus and process are provided for forming multiple copies of a document. The apparatus includes a moving photosensitive surface. Means are provided for forming the first copy of the document while the document is moving in synchronism with the photosensitive surface. Means are provided responsive to the first means for forming the second and additional copies of the document while the document is held stationary. The apparatus and process are adapted to substantially continuously form multiple copies of the document in a single copying run even though the first copy is formed by a mode of exposure different than the second and additional copies.

Figure 1:
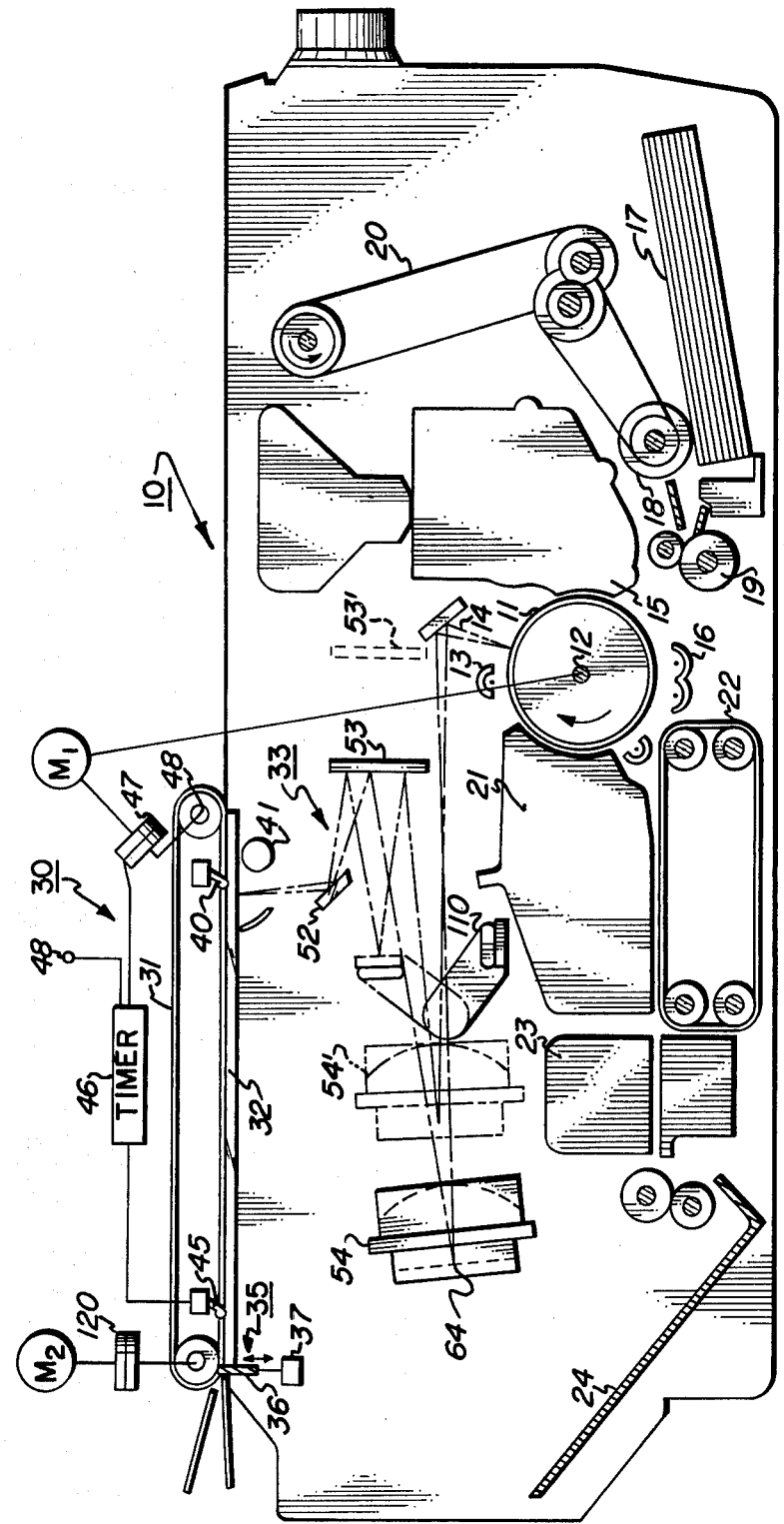
FIG. 1 is a schematic representation of a reproducing apparatus in accordance with the invention.

Referring now to FIG. 1, there is illustrated a schematic side view of an automatic xerographic copying machine 10 in accordance with one embodiment of the present invention. Basically, the xerographic processor includes a rotatably mounted photoconductive drum 11 which is supported upon a horizontally extended shaft 12. The drum is driven in the direction indicated whereby its photoconductive surface is caused to pass sequentially through a series of xerographic processing stations.

Because the xerographic process is widely known and used in the art, the various processing steps involved will be briefly explained below in reference to FIG. 1. Initially, the photoconductive drum surface is uniformly charged by means of a corona generator 13 positioned within a charging station located at approximately the 12 o'clock drum position. The charged drum surface is then advanced to an exposure station 14 wherein a flowing light image of an original document to be reproduced is projected onto the charged drum surface thus recording on the drum a latent electrostatic image containing the original input scene information. Next, subsequent to the exposure step in the direction of drum rotation is a developing station 15 wherein the latent electrostatic image is rendered visible by applying an electroscopic marking powder (toner) to the photoreceptor surface in a manner well known and used in the art. The now visible image is then forwarded into a transfer station 16 wherein a sheet of final support material 17 is brought into overlying moving contact with the toner image and the image transferred from the plate 11 to the support sheet by means of a corona generator 16.

In operation, a supply of cut sheets are supported within the machine. A pair of feed rollers 18 are arranged to operatively engage the uppermost sheet in the stack so as to first separate the top sheet from the remainder of the stack and then advance the sheet to pinch rolls 19 and then to the transfer station 16 in synchronous moving relationship to the developed image on the photoconductive plate surface 11. The motion of the rolls 18 and 19 is coordinated with that of the rotating drum surface, as well as the other machine components through the main drive system 20 whereby the support sheet is introduced into the transfer station in proper registration with the developed toner image supported on the xerographic plate.

After transfer, but prior to the reintroduction of the image portion of the drum into the charging station, the plate surface is passed through a cleaning station 21 wherein the residual toner remaining on the plate surface is removed. The removed toner particles are collected within a container where they are stored subject to periodic removal from the machine.

Upon completion of the image transfer operation, the toner bearing support sheet 17 is stripped from the drum surface and placed upon a moving vacuum transport 22 which serves to advance the support sheet into a thermal fusing station 23 wherein the toner image is permanently fixed to the sheet. The copy sheet with the fused image thereon is forwarded from the fuser into a collecting tray 24 where the sheet is held until such time as the operator has occasion to remove it from the machine.

Figure 2:
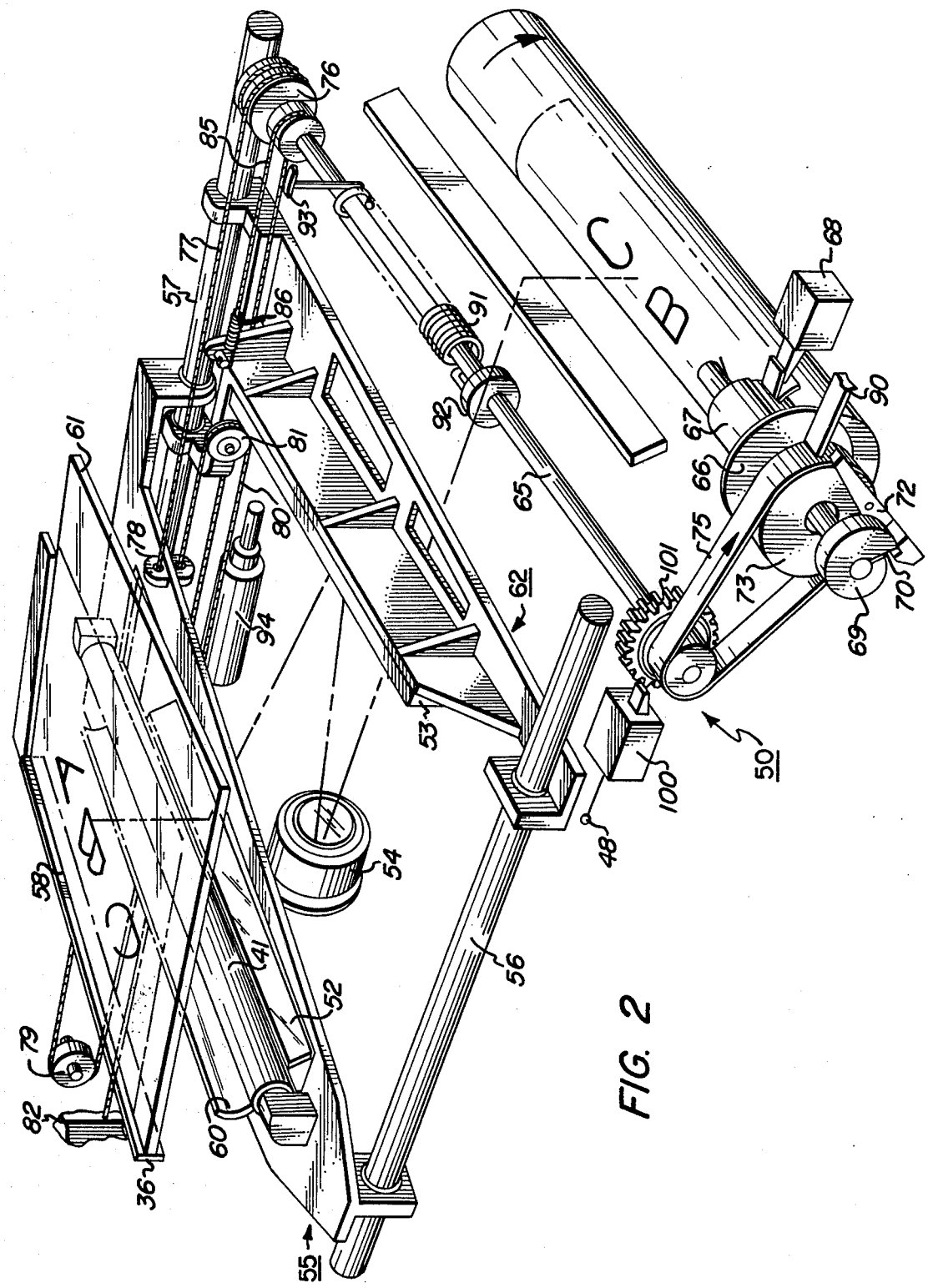
FIG. 2 is a perspective view of an optical system in accordance with one embodiment of the invention.

Having thus described a reproducing apparatus 10 of an electrostatographic type which can comprise an embodiment of an apparatus in accordance with the present invention, reference will now be had to FIG. 1 and 2 to provide further details concerning the present invention. In accordance with the present invention means 30 are provided for forming a first copy of a document while the document is moving in synchronism with the photosensitive surface 11. In the embodiment shown a document feeder 31 advances the document over the platen 32 so it can be viewed by the scanning optical system 33 which has been fixed near its end of scan position. The first copy of the document is thereby formed as the document moves onto the platen. To do this, the document feeder is arranged to move the document at a velocity which is synchronous with the velocity of the drum surface 11. For example, for a 1 to 1 magnification arrangement the document would move at the peripheral velocity of the drum.

This can be accomplished by using a common drive motor $M_1$ for both the drum 11 and the document feeder 31 as in the case, for example, in a Xerox 3100/LDC copier. A further description of such a drives approach may be had by reference to U.S. application Ser. No. 367,996 now U.S. Pat. No. 3,900,258 to Hoppner et al.

The document is advanced by the document feeder 31 at the peripheral velocity of the drum 11 or other desired synchronous velocity until it is registered upon the transparent viewing platen 32. A selectively actuable registration mechanism 35 is provided at the registration edge of the platen 32. The registration mechanism includes a stop member 36 which can be moved in and out of sheet blocking relationship at the registration edge of the platen by means of a conventional solenoid type actuator 37. The stop member or registration gate 36 is in its sheet blocking position as the first copy is formed and the document is fed until it abuts the registration gate. If desired, the document feeder 31 can overdrive the document against the gate 36 to insure proper registration. After the document is stopped, the gate may be retracted by actuator 37. The first exposure of the document is completed by the time it reaches the registration gate 36.

The first exposure of the document in the embodiment shown is initiated when the document trips the start switch 40 in the document feeder 31 which is arranged to engage the document through a slot in the belt. The start switch 40 operates as a start print switch to activate the illumination lamp 41 and to institute the other processes necessary in the reproducing apparatus to form a copy of the document as it is advanced past the fixed optics 33.

Just prior to intercepting the registration gate 36, the document intercepts a sensing switch 45. A timed registration interval is measured by conventional techniques, as for example, the use of a time delay as in U.S. Pat. No. 3,469,834 to Stange et al., or through the use of a timing arrangement as in U.S. patent application Ser. No. 503,584 abandoned in favor of U.S. patent application Ser. No. 654,449, to Taylor et al. The purpose of the time delay is to allow continued advancement of the document by the feeder 31 for a desired time to insure proper registration against the gate 36. After the time interval has expired, the timer 46 deactuates the document feeder by means of an electrically actuated clutch 47 interposed between the motor $M_1$ and the drive shaft 48 of the document feeder. The timer 46 can also be used to deactuate the solenoid 37 to retract the registration gate 56 following the timed interval. A signal would also be sent by the timer 46 by means of terminal 48 to the lock-out mechanism 50 as in FIG. 2, which holds the optics 33 fixed. This signal would be effective to disable the lock-out mechanism and allow the otpics to fly-back to their start of scan position in order to begin scanning the document for the second and additional copies which are desired.

The sensing switch 45 and timer 46 provide a means which is responsive to the formation of the first copy and for enabling the formation of additional copies while the document is held stationary on the platen 32.

While this responsive arrangement has been shown as a lead edge sensing switch 45 and timer 46, any desired means could be employed which would enable the optics 33 to begin a scanning or other mode of exposure for the stationary document substantially immediately following the completion of the moving original exposure.

Following document registration on the platen 32, the optics 33 fly-back and then scan the document to form exposures of it while it is held stationary for the second and all succeeding copies.

Scanning of the stationary original is accomplished by means of a first scanning mirror 52, a second compensating mirror 53, and a stationary objective lens element 54. The scanning mirror is supported upon a carriage 55 and the carriage is adapted to move back and forth over a prescribed horizontal path of travel below the platen surface. To this end, the carriage is slidably mounted upon two parallel aligned guide rails 56 and 57 by means of three bearings (not shown). The scanning mirror 52, as positioned upon the carriage, extends transversely across the platen surface in substantially parallel alignment with the platen start of scan margin 58. Mounted directly behind the scanning mirror on the carriage is an aperture lamp 41 and a reflector 60 which cooperate to illuminate a longitudinally extending incremental area upon the platen within the viewing domain of the scanning mirror. The carriage 55 is adapted to move across the platen at a constant rate whereby the mirror 52 scans successive illuminated incremental areas on the document beginning at the start of scan margins 58, and terminating at the opposite side of the platen at the end of scan margin 61.

A second movable carriage 62 is also provided upon which is supported the compensating mirror 53. The second carriage is also slidably mounted upon the guide rail 56 and 57 by means of three bearings housed within individual support mounts. The support mounts of carriage 62 are arranged to move in non-inferferring relationship with the support mounts carriage 55 througout the scanning operation. Compensating mirror 53 is positioned on the carriage 62 to receive reflected light rays eminating from the scanning mirror and redirecting these light rays back towards the stationary lens element 54.

Although any suitable lens can be employed herein a half lens system comprised of a two component split Dagor system is shown. A reflecting surface 64 is positioned at the lens stop position to reverse the received light rays as they pass through the lens components thus simulating a conventional symmetrical system. The lens system is basically an off axis objective which collects light from one side of the central axis and forms the image on the opposite side of the axis. For a more detailed description and further features of this type of lens, reference is had to U.S. Pat. No. 3,659,922 issued in the name of McCrobie.

As illustrated in FIG. 2, a pulley and cable drive system is herein provided to coordinate the movement of the scanning mirror carriage 55 and the compensating mirror carriage 62. The optics are driven via the optics drive shaft 65, the motion of which is regulated by a control mechanism. A gear 66 is operatively connected to the rotating xerographic drum, and is arranged to rotate at a predetermined rate therewith. The motion of the gear is imparted to drive shaft 65 through a wrap around clutch 67, the action of which is regulated by a solenoid 68. Affixed to the outboard end of the drive shaft 65 is a cam element 69 having a stop face 70 formed therein. A pawl 72 is pinned to drive pulley 73, which is mounted for free rotation upon the drive shaft 65, and is adapted to periodically translate the motion of the shaft to the pulley.

In scanning operation at the initiation of a copying cycle, the scanning mirror and the compensating mirror are both in their respective home positions and the wrap around clutch is disengaged. To start a copying sequence, solenoid 68 is energized pulling a latch (not shown) energizing the wrap around clutch. This, in turn, causes the shaft 65 to rotate in the direction indicated in timed relation with drum 11. The motion of the shaft 65 is imparted to the pulley 73 via cam 69 and pawl 72, which is engaging stop face 70, and translated to the optics drive shaft by means of a timing belt 75.

A two drum pulley 76 is rigidly affixed to the outboard end of the optics drive shaft 65 and adapted to turn with the shaft. A main drive cable 77 is wrapped about the large diameter drum of the pulley with one end of the cable anchored in the forward end of carriage 55 by means of an adapter 78 and the opposite end of the cable passed about a reversing pulley 79 and being similarly secured in the back end of the same carriage. This particular arrangement makes the scanning carriage a part of the endless loop cable system whereby the carriage responds instantaneously and positively to any movement of the optic drive shaft.

In this particular embodiment of the instant invention, the movement of the compensating mirror carriage 62 is coordinated with that of the scanning mirror carriage by means of a control cable 80. As illustrated in FIG. 2, one end of the control cable is anchored in the forward end of the scanning carriage by means of the adapter 78 and is passed around an idler pulley 81 journaled for rotation in the rear portion of carriage 62, and affixed to the machine frame 82. As can be seen, the compensating mirror carriage 62 is continuously repositioned in regard to the scanning mirror carriage by the control cable as the scanning mirror is driven through the copying cycle. Although a control cable arrangement is herein employed to coordinate the movement of the two mirrors, it should be clear to one skilled in the art that anyone of a wide variety of mechanical devices can be similarly employed to accomplish this desired result without depending from the teachings of the present invention. In practice, the rate of the scanning mirror is set as desired and the motion of the compensating mirror regulated in respect thereto so as to present a flowing light image of the original at the photoreceptor surface.

An auxiliary drive cable 85 is also provided to aid in transporting the compensating mirror carriage throughout the scanning phase of each copying cycle. One end of the cable is secured to the smaller drum of the pulley 76 and the opposite end of the cable tied to the compensating mirror carriage by an extension spring 86. As the optics drive shaft is rotated in a clockwise direction (FIG. 2) the cable 65 is wound upon the smaller drum of the pulley pulling the mirror carriage from its home position towards the platen end of scan margin 61. Sufficient play is provided by the spring to allow the control cable 80 to act as the predominant control mechanism within the system while still enabling the drive pulley 76 to aid in the movement of the carriage. Alternatively, the control cable 80 can be removed from the system and cable 85 connected in an endless loop arrangement similar to cable 77 to the compensating mirror carriage. In this manner, the continuous repositioning of the two mirrors can be programmed by controlling the diameter ratio between the large drum and the small drum pulley 76. This ratio is generally selected to be 2:1, respectively, so as to maintain a constant conjugate as the mirrors scan.

In a preferred embodiment of the present invention rotation of the cam 69 through approximately 319° will provide a sufficient angular displacement of the compensating mirror to their end of scan as shown in FIG. 1. At the 319° mark, the pawl 72 contacts a striker bar 90 which disengages the pawl from stop face 70, thus freeing the drive pulley 73, and as a consequence, the optics drive shaft 65 from the input drive mechanism. At this time, the wrap around clutch is still engaged and continues to turn the cam 69 through a full 360° of rotation preparatory to the initiation of the next subsequent copying cycle. The release of the optics drive shaft from the main drive begins mirror restoration to the start of scan unless the optics are to be fixed at the end of scan.

A wind up spring 91 is wrapped about the optics drive shaft 65 in the manner illustrated in FIG. 2. One end of the spring is locked to the shaft by means of a retainer 92 while the other end of the spring is secured in the machine frame 93. As the shaft is rotated in a clockwise direction during the scanning phase, the spring is wound to a fully loaded condition. At the 319° mark, when the drive pulley is released, the loaded spring is permitted to unwind turning the optics drive shaft in an opposite or counter clockwise direction. This, in turn, causes the two mirror carriages to move back over the guide rails toward their start of scan or home positions. In order to conserve valuable machine time, mirror restoration is accomplished in a minimum amount of time, preferably within a time peroid that is considerably shorter than the scanning period.

A dashpot 94 is provided to control the motion of the two carriages during the final portion of the restoration phase of the copying cycle. The dashpot is arranged to physically engage the scanning mirror carriage as it approaches the home position and serves to decelerate the carriage, and thus the entire system, thereby preventing the optics from being disturbed or damaged.

Further details of a scanning optical system as described above can be found in U.S. Pat. No. 3,832,051, to Shogren.

Having thus described a scanning optical system for providing the stationary document mode of exposure, it is, of course, necessary to provide some means for fixing the optical system in a given position during the moving mode of exposure. As previously described various well known devices for doing this are available, as for example, that employed in the Xerox 3100 LDC copier, and that described in the above noted Hoppner et al. application. For purposes of example, however, and without any limitation being intended, referring to FIG. 2, there is shown a solenoid actuated latch 100 which can engage gear 101 pinned to the optics drive shaft 65 to lock the optics drive shaft with the optics at any desired position, as for example, the end of scan position. The actuation of this latch mechanism is timed off of the sense switch 45 by timer 46 through terminal 48 previously described. In operation of the present apparatus 10 the first copy is formed by moving original exposure as the document moves on to the platen 32. As the lead edge of the document is sensed by switch 45, timer 46 provides a reference time interval following which the document feeder 31 is disengaged by clutch 47 and registration gate 36 is retracted by solenoid 37. During the moving original exposure, the latch 100 holds the optics at their end of scan position and the scanning mechanism is disengaged through solenoid 68 acting on clutch 67. Following the reference time interval the latch 100 is disengaged allowing the optics 33 to fly-back to its start of scan position. Upon sensing by any conventional means (not shown) that the optics have reached the home position, the solenoid 68 is disabled thereby engaging clutch 67 to begin the scanning operation as described above. Following the last scanning exposure the optics 33 can be held at the end of scan position in preparation for the next copying run by engaging latch 100.

In accordance with this invention there is no loss in throughput as compared to a conventional approach wherein a document is rapidly advanced on to the platen and then scanned for all copies in the run. With the present invention it is only necessary to advance the document on to the platen at a velocity synchronized to the velocity of the photosensitive surface. The time necessary for the optics to fly-back to the start of scan position for scanning the second and further copies is no greater than the time necessary for fly-back if the first copy had been formed by scanning. Therefore, in accordance with the present invention, a markedly improved document feeding and exposure arrangement is provided which should substantially reduce document damage by reducing the velocity of the document as it is fed over the platen.

The invention has thus far been described with reference to a reproducing apparatus 10 adapted to form multiple copies from a document by making the first copy in a run with a moving original exposure system, and second and subsequent copies with a stationary original exposure system. It is possible in accordance with this invention and other embodiments thereof to include additional modes of operation in the apparatus.

For example, the document feeder 31 of the apparatus of FIG. 1 can be employed for large document exposures much in the manner of the Xerox 3100 LDC copier. With the optics fixed at the end of scan position or other desired position, it is impossible to feed documents of any desired length over the platen 32 past the fixed optics system and feed a copy sheet 17 of comparable length through the processor for image transfer thereto.

It is possible for the reproducing apparatus 10 in accordance with this invention to include one or more modes of reduction or variable magnification. In the apparatus shown in FIG. 1, movement of the lens 54 to the position shown in phantom 54' and insertion of an add mirror 110, as shown in phantom to provide a reflective cavity in accordance with the teachings of U.S. patent application Ser. No. 588,974 to Spinelli et al. provides a reduction mode for moving document exposure. Alternatively, any well known approach could be used for providing variable magnification or reduction during scanning or moving document exposure as, for example, those described in U.S. Pat. No. 3,614,222 to Post, changing the relative position of mirror 53 to 53' and moving lens 54 to 54'.

The document feeder of the present invention can also be operated in a single copy mode wherein documents are fed on and off the platen 32 serially past the fixed slit optical system to form moving original exposures. This stream feeding approach is similar in many respects to the stream feeding operation of the Xerox 3100 LDC copier and offers several throughput advantages for making single copies of documents.

In accordance with this invention a significant advantage comes from the ability to place documents over the platen 32 at a relatively slow speed as compared to conventional document handling systems. This also results in the documents being fed off the platen at a similar slow speed. If desired, however, an additional motor M2 and clutch 120 arrangement can be provided to provide a high speed ejection of the document from the platen. This would have the beneficial effect of reducing the time the operator would have to wait to remove a document after it has been copied. Alternatively, means can be provided for pivoting the document feeder 31 away from the platen following the last copy exposure so that the document may be readily removed by hand. A document feeder with rapid document ejection and document feeder release modes of operation is described in U.S. application Ser. No. 449,307 Now U.S. Pat No. 3,888,582 to Griswold,. The document feeder 31 shown in FIG. 1 frictionally engages the document to advance it over the platen. The invention is not intended to be limited solely to such a feeder. Any desired document feeding arrangement could be used. For example, the document feeder could be spaced from the platen by an amount less than the depth of focus of the optics and a vacuum transport used to advance the documents as in U.S. application Ser. No. 561,465, to Caldwell.

While the apparatus of the present invention has been described by reference to an embodiment wherein the scanning optics 33 are fixed within the viewing domain of the platen 32 to provide moving original exposure. It is possible to provide a separate slit optical system adjacent to the platen for providing the moving original exposure much as in U.S. Pat. No. 3,833,296 to Vola et al. Further, it is possible in accordance with this invention much in the manner of the previously noted patent to Kelly to provide separate optical systems for each mode of operation, namely, a fixed slit optical system for moving document exposure and a scanning or full frame exposure system for stationary document exposure with a tilting mirror or other suitable system for switching between the respective optical systems. Therefore, while the invention has been described with reference to the use of a sole optical system for both modes of operation it is intended to encompass as well the use of separate optical systems and a means for switching from one optical system to the other.

The exposure system utilized for moving original exposure can be of any design as are well known in the art for forming this type of exposure. Similarly, the exposure system for forming stationary original exposure can be of any desired design as are well known in the art for forming a stationary original exposure.

The use of a sole scanning optics system in accordance with the description herein which may be fixed at a at a given position below a platen for stationary slit exposure is preferred because of its compactness and economy.

"Copying run" as the term is utilized herein refers to the number of copies formed of a document for each occasion that it is fed to platen for copying. In accordance with this invention the first copy in the run can be formed as the document is fed on to the platen and the remaining copies in the run can be formed while the document is held stationarily on the platen. In accordance with this invention the document can be recirculated for making more than one copying run. The Xerox 9200 machine includes a document feeder adapted to provide such recirculation of the document for making a plurality of multiple copy runs.

The patents, applications, and commercial machines referred to specifically in this application are intended to be incorporated by reference into the application.

It is apparent that there has been provided in accordance with this invention a reproducing apparatus and process for forming multiple copies of a document which fully satisfies the objects, means and advantages set forth hereinbefore. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A reproducing apparatus for forming multiple copies of a document in a copying run, said apparatus including:
   a moving photosensitive surface;
   means for forming the first copy of said document in said run while said document is moving in synchronism with said photosensitive surface; and
   means automatically responsive to said first copy forming means for forming at least one additional copy of said document in said run while said document is held stationary.

2. An apparatus as in claim 1, wherein said multiple copies are formed substantially continuously.

3. An apparatus as in claim 1, wherein said first copy forming means includes optical means for viewing said moving document and projecting an image thereof onto said photosensitive surface, and wherein said additional copy forming means includes optical means for viewing said stationary document and projecting an image thereof onto said photosensitive surface.

4. An apparatus as in claim 3, wherein said optical means comprises a multi-mode optical exposure system including scanning optical means for viewing said stationary document, said scanning optical means being flexible in a given position for viewing said moving document.

5. An apparatus as in claim 3, wherein said optical means includes means for providing projected images at a first magnification or at at least one additional and different second magnification.

6. An apparatus as in claim 3, wherein said first and additional copy forming means further include: means for charging said photosensitive surface, whereby said projected image forms a corresponding electrostatic image; means for developing said electrostatic image to render it visible; and means for transferring said developed image to a sheet of final support material.

7. An apparatus as in claim 1, further including a transparent viewing platen, document feeding means for advancing a document over said platen at a speed synchronized to the speed of said photosensitive surface, and for holding said document stationary thereover, said first copy forming means being operative as said document is advanced by said document feeding means over said platen, and said means for forming additional copies of said document being operative while said document is held stationary over said platen.

8. An apparatus as in claim 7, further including means for rapidly ejecting a document from said platen following the copy run.

9. An apparatus as in claim 7, wherein said first copy forming means includes optical means for viewing said moving document and projecting an image thereof onto said photosensitive surface, and wherein said additional copy forming means includes optical means for viewing said stationary document and projecting an image thereof onto said photosensitive surface.

10. An apparatus as in claim 9, wherein said feeding means includes a document feeding belt for advancing documents over said platen.

11. An apparatus as in claim 1, wherein said first copy forming means includes means for forming copies of documents larger than said platen as measured in the direction of movement of said document.

12. The process of forming multiple copies of a document in a copying run, comprising:
providing a moving photosensitive surface;
forming the first copy of said document in said run while said document is moving in synchronism with said photosensitive surface; and
forming automatically in response to the formation of said first copy at least one additional copy of said document in said run while said document is held stationary.

13. A process as in claim 12, wherein said multiple copies are formed substantially continuously.

14. The process as in claim 13, wherein said first copy forming step includes the steps of viewing said moving document and projecting an image thereof onto said photosensitive surface, and wherein said additional copy forming step includes the steps of viewing said stationary document and projecting an image thereof onto said photosensitive surface.

15. A process as in claim 14, further including the steps of:
providing a multi-mode optical exposure system including a scanning optical means, and
fixing said scanning optical means at a given position for viewing said moving document.

16. A process as in claim 14, including the steps of:
providing a multi-mode optical means including scanning optical means, and
scanning said optical means past said stationary document.

17. A process as in claim 14, further including the steps of:
providing a transparent viewing platen;
feeding said document over said platen during said first copy forming step; and
holding said document stationary over said platen during said additional copy forming step.

18. A process as in claim 17, further including the step of:
rapidly ejecting said document from said platen at the end of said copying run.

19. A process as in claim 14, further including the step of varying the projected image magnification.

20. The process as in claim 14, wherein said copy forming steps further include the step of: charging said photosensitive surface, whereby said projecting image forms a corresponding electrostatic image; developing said electrostatic image to render it visible; and transferring said developed image to a sheet of final support material.

21. A reproducing apparatus for forming multiple copies of a document in a copying run, said apparatus including:
a moving photosensitive surface; and
means for forming the first copy of said document in said run while said document is moving in synchronism with said photosensitive surface, and for automatically and substantially continuously forming at least one additional copy of said document in said run while said document is held stationary.

22. The process of forming multiple copies of a document in a copying run, comprising:
providing a moving photosensitive surface;
substantially continuously and automatically forming the first copy of said document in said run while said document is moving in synchronism with said photosensitive surface, and forming at least one additional copy of said document in said run while said document is held stationary.

* * * * *